(12) United States Patent
Liu

(10) Patent No.: US 8,099,598 B1
(45) Date of Patent: Jan. 17, 2012

(54) SECURE MESSAGING SYSTEM WITH AUTOMATIC RECIPIENT ENROLLMENT

(76) Inventor: Gary Gang Liu, Plano, TX (US)

( * ) Notice: Subject to any disclaimer, the term of this patent is extended or adjusted under 35 U.S.C. 154(b) by 1059 days.

(21) Appl. No.: 11/028,098

(22) Filed: Jan. 3, 2005

(51) Int. Cl.
*H04L 9/32* (2006.01)

(52) U.S. Cl. ........ 713/170; 713/150; 713/156; 380/277; 380/255; 726/4; 726/27; 709/206

(58) Field of Classification Search .................. 713/150, 713/156, 170; 380/255, 277; 709/206; 726/4, 726/27
See application file for complete search history.

(56) References Cited

U.S. PATENT DOCUMENTS

| | | | | |
|---|---|---|---|---|
| 5,341,426 A * | 8/1994 | Barney et al. | ................. | 713/171 |
| 5,734,718 A * | 3/1998 | Prafullchandra | ............. | 713/183 |
| 5,812,764 A * | 9/1998 | Heinz, Sr. | ........................... | 726/5 |
| 6,061,448 A * | 5/2000 | Smith et al. | ................... | 380/282 |
| 6,732,101 B1 * | 5/2004 | Cook | | |
| 6,760,752 B1 * | 7/2004 | Liu et al. | | |
| 6,978,025 B1 * | 12/2005 | Price, III | ...................... | 380/282 |
| 7,123,722 B2 * | 10/2006 | Filipi-Martin et al. | ....... | 380/279 |
| 7,127,613 B2 * | 10/2006 | Pabla et al. | .................... | 713/171 |
| 7,624,269 B2 * | 11/2009 | Appenzeller et al. | ......... | 713/171 |
| 2002/0007453 A1 * | 1/2002 | Nemovicher | ................. | 713/155 |
| 2002/0023213 A1 * | 2/2002 | Walker et al. | ................ | 713/168 |
| 2003/0081785 A1 * | 5/2003 | Boneh et al. | | |
| 2003/0147536 A1 * | 8/2003 | Andivahis et al. | ............ | 380/277 |
| 2004/0081321 A1 * | 4/2004 | Struik | ............................ | 380/278 |
| 2004/0249817 A1 * | 12/2004 | Liu et al. | ........................... | 707/9 |

FOREIGN PATENT DOCUMENTS

GB 2400284 * 6/2004

* cited by examiner

*Primary Examiner* — Edan Orgad
*Assistant Examiner* — Kari Schmidt

(57) ABSTRACT

A public-key based secure messaging system with automatic receiver enrollment is disclosed. A sender in the system first determines whether a receiver has a public key. If the receiver has a public key, the messages will be sent to the receiver using a standard public-key based encryption. If the receiver does not have a public key, the first message will be sent to the receiver using a delivery method that does not require the receiver to have a pair of public and private keys prior to sending the message. However, when the receiver accesses the first message, a pair of public and private keys will be automatically generated at the receiver and the public key will be made available for encrypting subsequent messages sent to the receiver.

20 Claims, 8 Drawing Sheets

An Example of Automatic Enrolling Delivery Method
(can be used in Step (108) of Fig. 2 or Step (205) of Fig. 3)

If Step (103) of Figure 2 or Step (205) of Figure 3
determines that the Receiver is not yet enrolled

↓

Step (300): After determining that the Receiver does not have a public key, the Certificate/Key Server generates a symmetric key and a "first time password," sends the symmetric key to the Sender, sends the first time password to the Receiver using plaintext email, and stores both the symmetric key and the first time password associated with the Receiver's email address.

↓

Step (301): Sender encrypts the message using the symmetric key received from the Certificate/Key Server and sends the encrypted message to the Receiver. Optionally, a hash of the symmetric key may be sent along with the encrypted message.

↓

Step (302): After receiving the encrypted message, the Receiver downloads software and generates a pair of public and private keys.

↓

Step (303): Receiver stores the private key locally and sends the public key to the Certificate/Key Server along with the first time password and optionally the hash of the symmetric key.

↓

Step (304): Certificate/Key Server checks whether the first time password and the optional hash of the symmetric key received from the Receiver are correct, and if so, returns the symmetric key to the Receiver and stores the public key associated with the Receiver's email address. (The Receiver is now enrolled.)

↓

Step (305): The Receiver decrypts the message using the symmetric key received from the Certificate/Key Server.

↓

End

FIG. 4

An Example of Automatic Enrolling Delivery Method Using Identity Based Encrypting
(can be used in Step (108) of Fig. 2 or Step (205) of Fig. 3)

If Step (103) of Figure 2 or Step (205) of Figure 3 determines that the Receiver is not yet enrolled Step (400): Sender encrypts the message for the Receiver using Identity Based Encryption (IBE) and sends the encrypted message to the Receiver.

Step (401): After receiving the encrypted message, the Receiver downloads software and generates a pair of public and private keys.

Step (402): Receiver stores the private key locally and sends the public key to the Certificate/Key Server along with authentication information to prove Receiver's identity.

Step (403): Certificate/Key Server verifies the authentication information received from the Receiver, and if verified, generates the Receiver's IBE private key using the master secret, sends the IBE private key to the Receiver, and stores the Receiver's public key associated with the Receiver identity (email address). (The Receiver is now enrolled.)

Step (404): The Receiver decrypts the message using the IBE private key received from the Certificate/Key Server. (Note: IBE private key is only used for decrypting the first message. After that, it can be discarded.)

End

FIG. 5

An Example of Automatic Enrolling Delivery Method Using Web Based Delivery
(can be used in Step (108) of Fig. 2 or Step (205) of Fig. 3)

If Step (103) of Figure 2 or Step (205) of Figure 3
determines that the Receiver is not yet enrolled Step (500): Sender encrypts the message for a Delivery Server and sends the encrypted message to the Delivery Server.

Step (501): The Delivery Server stores the message and sends an email notification and a first time password to the Receiver. The notification and first time password may be sent in one email or separate emails from different locations. The notification may contain a secret code.

Step (502): After receiving the notification and first time password, the Receiver accesses the message stored at the Delivery Server using a web browser through SSL.

Step (503): When the Receiver is authenticated using the first time password and the secret code to access the message stored at the Delivery Server, an ActiveX or an applet is automatically downloaded to the Receiver.

Step (504): The ActiveX or applet generates a pair of public and private keys, stores the private key locally, and sends the public key to the Certificate/Key Server along with authentication information. The Certificate/Key Server stores the public key associated with Receiver's email address if the authentication information is correct. (The Receiver is now enrolled.) The content of the message will then be displayed in the Receiver's web browser.

End

FIG. 6

SECURE MESSAGING SYSTEM WITH AUTOMATIC RECIPIENT ENROLLMENT

BACKGROUND

The invention relates generally to computing systems and more particularly to a method and system for providing secure data transmissions between Internet users.

Public-key based secure messaging systems allow users to communicate securely over the Internet. Examples of public-key based secure messaging systems include S/MIME (see RFC3850-3855 of IETF) and PGP (see RFC 2440 of IETF). Although such systems have existed for many years and have been promoted by major companies, very few people use such systems today. One problem with these systems is that the recipient must have a pair of public and private keys before the message can be encrypted and sent to the recipient. In other words, the recipient must be enrolled into the system first before any sender can send a secure message to the recipient. Another problem with this type of system is that an impostor can publish a public key and claim that it belongs to someone else. To address this issue, a trusted certificate authority (CA) is needed to authenticate individuals and certify to others that the individual's public key is authentic. Unfortunately, this adds further complexity to the recipient enrollment process because the recipient not only needs to generate a pair of public and private keys but also must contact the CA to have the public key certified before any sender can send a secure message to the recipient. Even after the recipient has generated a pair of public and private keys and has obtained a certificate, the sender still cannot send a secure message to the recipient. The sender must somehow obtain the recipient's certificate from the recipient before sending a message to the recipient. The requirement that a recipient must be enrolled first before a message can be sent and the high barrier that both the sender and the recipient must overcome to become enrolled are major reasons why these prior art systems have not been widely accepted.

David Cook and the same inventor of the present invention have disclosed a secure transmission system (U.S. Pat. No. 6,760,752) that significantly reduces the barrier for a user to be enrolled. The system hosts every user's public key in a central key server. A user only needs to generate a pair of public and private keys and answer a confirmation email to become enrolled. The recipient's public key is retrieved and certified each time when a message is sent to the recipient. However, the system still requires the recipient to be enrolled first before a message can be sent to the recipient.

There are significant differences in terms of usability between a system that requires a recipient to be enrolled first before a message can be sent and a system that allows the message to be sent first before the recipient is enrolled. When a sender wants to send a secure message to a recipient not yet enrolled, the recipient usually has no idea that a secure message is coming. If the recipient must be enrolled first before the message can be sent, the sender must first communicate with the recipient and ask him/her to become enrolled. Then, the sender may need to wait for some time and check again to make sure that the recipient has been enrolled or wait until the recipient tells the sender that he/she has been enrolled before actually sending the message. The message cannot be sent immediately when the need for sending a secure message arises. The situation is particularly complex when an identical message needs to be sent to multiple recipients and some recipients are enrolled and some are not. If the message can be sent before the recipient is enrolled, then the sender can always send the message to any recipient regardless of whether the recipient is enrolled. Although the recipient may need to be authenticated and become enrolled before being able to read the message, a secure message sitting in the recipient's inbox waiting to be read gives the recipient greater incentive to go through an authentication and enrollment process. This will help enroll more users into the system. For these reasons, a system that allows a message to be sent before the recipient is enrolled offers significant advantages over a system that requires the recipient to be enrolled first before a message can be sent.

David Cook disclosed a secure forwarding system (U.S. Pat. No. 6,732,101) that allows a message to be sent to a recipient before the recipient is enrolled. The system first looks up the recipient's public key from a central key server. If the recipient's public key is found, the message will be encrypted using the recipient's public key and sent to the recipient directly. If the recipient does not have a public key in the central key server, the message will be encrypted and sent to a forwarding server where the recipient can pick up the message using a web browser through a secure link, such as SSL. The message can be sent regardless of whether the recipient is enrolled into the system. If the recipient is not already enrolled, the recipient is required to go through an authentication process to establish a password at the forwarding server before being able to pick up the message. The problem with the system disclosed by David Cook is that web-based delivery methods are less secure than public-key-based delivery methods. The forwarding server has access to every message stored there. Another problem with the system disclosed by David Cook is that a recipient enrolled into web-based delivery is usually stuck there. There is no easy way to turn him/her into a user of the public-key based delivery method.

Dan Boneh and Matthew Franklin have disclosed an Identity Based Encryption (IBE) system (US pre-grant publication No. 20030081785) that also allows a message to be sent to a recipient before the recipient is enrolled. In an IBE system, the "public key" is simply the identity of the recipient, such as the recipient's name or email address. The system does not require the recipient to generate a pair of public and private keys before the message can be sent, because the message can be encrypted simply using the recipient's identity. In order to decrypt the message, however, the recipient is required to authenticate him/herself to a central server, and the central server will generate the corresponding private key for the recipient and the recipient can use the private key to decrypt the received messages. The problem with this system is that the central server holds a "master secret" for generating every user's private key. In other words, the central server knows everybody's private key, and therefore, the system is less secure than a standard public-key based encryption system.

Neither the secure forwarding system disclosed by David Cook nor the identity-based encryption system disclosed by Dan Boneh and Matthew Franklin can offer the same level of security provided by a standard public-key based encryption system. In a standard public-key based encryption system, the user who generates the public/private key pair is usually the only person who has access to the private key and can decrypt a message encrypted using the corresponding public key. No master secret or forwarding server exists that can derive any user's private key or obtain the message content without the private key. Prior art systems, therefore, either can not offer the capability of allowing a message to be sent before the recipient is enrolled or can offer such a capability but at the cost of degraded security. There is a need for a system and method that offers the capability of allowing a secure message to be sent before the recipient is enrolled while preserving as much as possible the high level security provided by a standard public-key based encryption system.

SUMMARY

In one aspect, the invention provides a system and method that allows a secure message to be sent to a recipient before the recipient is enrolled while preserving as much as possible the high level security provided by a standard public-key based encryption system. A sender in the system is allowed to send secure messages to both enrolled recipients and recipients not yet enrolled. The sender first determines whether a recipient is enrolled by checking whether the recipient has a public key. Recipients already enrolled will have a public key and the messages will be sent to them using public-key based encryption. For a recipient not yet enrolled, receiving a first message will automatically make the recipient enrolled. More specifically, the first message will be sent to the recipient not yet enrolled using a delivery method that does not require the recipient to have a pair of public and private keys prior to sending the message. However, when the recipient accesses the first message, a pair of public and private keys will be generated for the recipient and the public key will be made available for encrypting subsequent messages sent to the recipient.

The sender can determine whether the recipient is enrolled by checking with a central key server each time when sending a message. Alternatively, the sender may first check if an unexpired certificate of the recipient has been stored locally and then check with the central server only when an unexpired certificate cannot be found locally.

The recipient can be authenticated before being allowed to access the first message. The recipient can be authenticated to access the message using a password sent to the recipient's email address. Alternatively, the recipient can be authenticated to access the message using evidence that he/she can receive email messages sent from at least two different sources to his/her email address.

The delivery method that does not require the recipient to have a pair of public and private keys prior to sending the message can include a web-based delivery method or an identity-based encryption method. The advantage of using a web-based delivery method is that the recipient does not have to explicitly download a software program for automatic enrollment process. Such a software program can be implicitly downloaded as an ActiveX or an applet. The advantage of using an identity-based encryption method is that the encrypted message is directly sent to the recipient. It does not require a high capacity forwarding server to handle every message. The present invention also provides several alternative delivery methods that do not require the recipient to have a pair of public and private keys prior to sending the message.

One of the alternative delivery methods that do not require the recipient to have a pair of public and private keys prior to sending the message includes: encrypting the message using a secret key, making the secret key accessible to a key server, sending the encrypted message to the recipient, sending the secret key from the key server to the recipient after the recipient is authenticated, and using the secret key to decrypt the message at the recipient. The advantage of this alternative is that it is easier to implement than the IBE method but still allows the encrypted message to be directly sent to the recipient without requiring a high capacity forwarding server to handle every message.

A second alternative delivery method that does not require the recipient to have a pair of public and private keys prior to sending the message includes: encrypting the message using a secret key, encrypting the secret key using a receiver specific key, storing the receiver specific key associated with the receiver at a key server, sending the encrypted secret key and the encrypted message to the receiver, sending the receiver specific key from the key server to the receiver after the receiver is authenticated, using the receiver specific key to decrypt the secret key, using the secret key to decrypt the message, and storing the receiver specific key into an encrypted key file at the receiver. The advantage of the second alternative is that it allows multiple messages to be sent to a recipient not yet enrolled. However, after the recipient becomes enrolled by opening one of the messages sent before the enrollment, the recipient will be able to open all messages in the same manner regardless of whether the message was sent before or after the enrollment.

These and other advantages will be apparent upon a review of the specification, the drawings, and the attached claims.

DESCRIPTION OF THE DRAWINGS

FIG. 4 shows an implementation of the "Automatic Enrolling Delivery Method" used in FIG. 2 and FIG. 3.

FIG. 5 shows an alternative implementation of the "Automatic Enrolling Delivery Method" using identity based encryption (IBE).

FIG. 6 shows a third alternative implementation of the "Automatic Enrolling Delivery Method" using web-based delivery.

DETAILED DESCRIPTION

Figure 1:
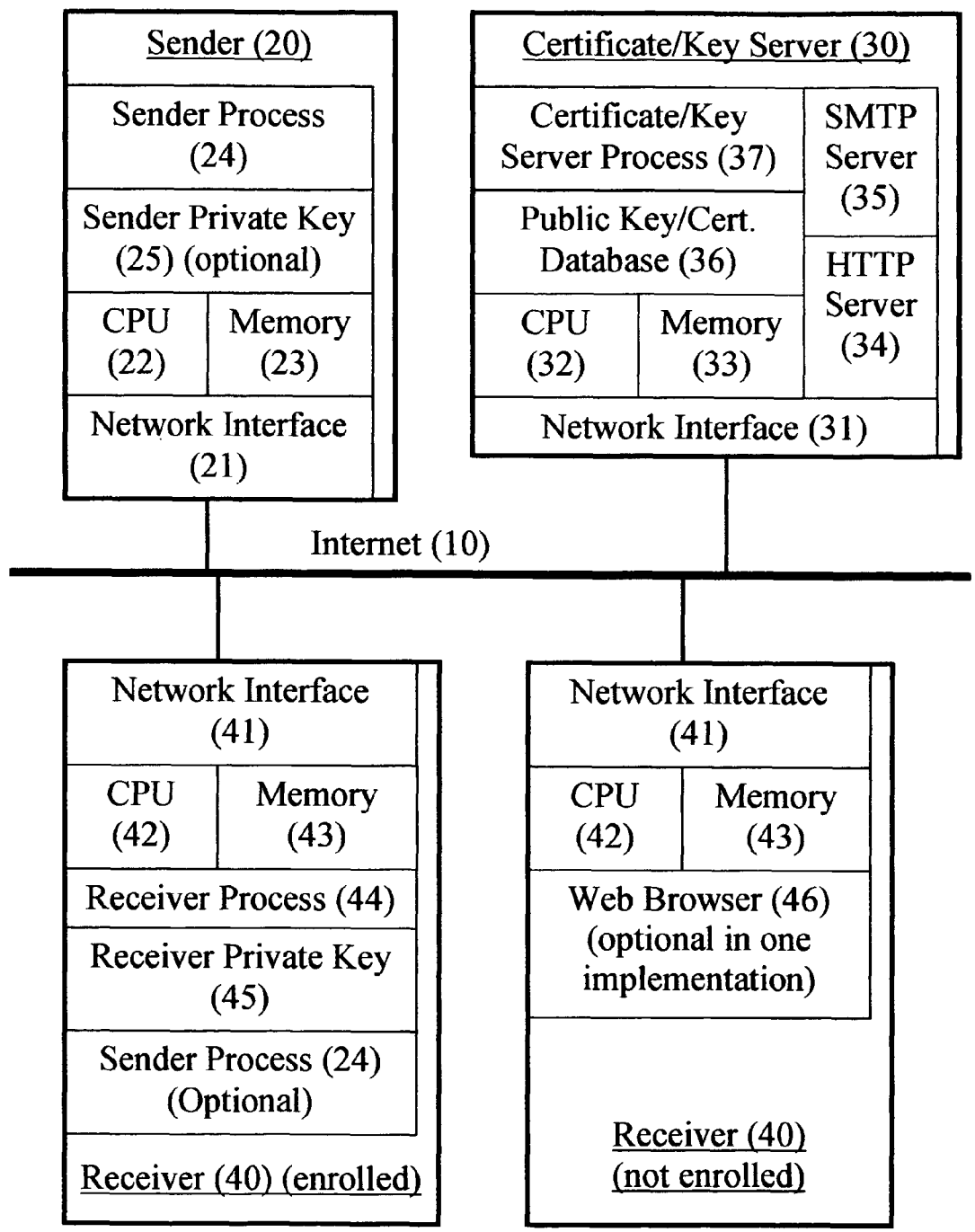
FIG. 1 shows a block diagram of a secure messaging system with automatic recipient enrollment.

FIG. 1 shows the block diagram of a secure messaging system with automatic recipient enrollment. The system typically operates on the Internet (10). However, it can also operate on other types of communication networks. The system includes a Sender (20), a Certificate/Key Server (30), and a Receiver (40), all connected to the Internet (10). Two types of Receiver (40) are shown in FIG. 1—Receiver already enrolled and Receiver not enrolled. Receiver not enrolled will become enrolled after it is authenticated to access the first message sent to the Receiver. The details of this process will be discussed below in the descriptions related to FIGS. 2, 3, 4, 5, 6, 7, and 8.

Sender (20) is a general purpose or special purpose computer or computing device for sending out secure messages. It includes a Network Interface (21) for connecting to the Internet (10), a CPU (22), and Memory (23). It can also include other devices of a general purpose or special purpose computer, such as a hard drive, a display monitor, etc. It can also be a cluster of computers or computing devices. The Sender (20) also includes a Sender Process (24) for carrying out various processing steps at the Sender (20). The details of these processing steps are described below in conjunction with FIGS. 2, 3, 4, 5, 6, and 7. Some of the steps may be carried out by a human operator. In such a case, the Sender Process (24) will provide appropriate user interfaces for carrying out these steps. Optionally, it can include a Sender Private Key (25). The advantage of including a Sender private key is that the message sent out can be digitally signed by the Sender (20).

Certificate/Key Server (30) is a server computer or a cluster of server computers for making users' public keys or certificates available for other users to retrieve and for carrying out other server side tasks described later in conjunction with FIGS. 2, 3, 4, 5, 6, 7, and 8. A Certificate/Key Server (30) includes the components of a typical server computer on the Internet, such as a Network Interface (31), a CPU (32), Memory (33), an HTTP Server (34), and an SMTP Server (35). It can also include other devices of a general purpose or special purpose computer, such as hard drives, display monitors, backup devices, etc. Certificate/Key Server (30) includes a Public Key/Certificate Database (36) which stores every user's public key or certificate. In one implementation, the Public Key/Certificate Database (36) only stores each user's public key associated with the user's email address. The certificate that certifies the user's public key will be issued in real time when the public key is retrieved. In an alternative implementation, a previously-issued static certificate that ties the user's identity with the public key is stored in the database for each user. Certificate/Key Server (30) also includes a Certificate/Key Server Process (37) for carrying out various tasks which will be described later in conjunction with FIGS. 2, 3, 4, 5, 6, 7, and 8.

Receiver (40) can be a general purpose or special purpose computer or computing device for receiving secure messages. Before a Receiver (40) becomes enrolled, it includes a Network Interface (41) for connecting to the Internet (10), a CPU (42), and Memory (43). It can also include other devices of a general purpose or special purpose computer, such as a hard drive, a display monitor, etc. It can also be a cluster of computers or computing devices. In one implementation, the Receiver (40) can include a Web Browser (46). After the Receiver (40) becomes enrolled, it will include additional elements such as a Receiver Private Key (45) and a Receiver Process (44). In addition, the Receiver's public key corresponding to Receiver Private Key (45) will be stored at the Certificate/Key Server (30). A secure message can be sent to the Receiver (40) regardless of whether the Receiver (40) is enrolled. However, after a Receiver not yet enrolled is authenticated to access the first message, it will become enrolled automatically. The details of the enrollment process will be described below in conjunction with FIGS. 2, 3, 4, 5, 6, 7, and 8. The Receiver Process (44) will be responsible for carrying out the processing steps that occur at the Receiver (40). Some of the processing steps may be carried out by a human operator. In such a case, the Receiver Process (44) will provide appropriate user interfaces for carrying out these steps. Optionally the Receiver (40) can include the Sender Process (24) also. If the Sender Process (24) is included, the Receiver (40) becomes a combined Sender and Receiver. It can carry out functions of both the Sender and the Receiver. The advantage of including the Sender Process (24) into the Receiver (40) is that, once the Receiver (40) becomes enrolled, it will be able to send secure messages to more Receivers and cause these Receivers to become enrolled. In this way, the system can become "self-multiplying"—the more users the system has, the more quickly it can enroll new users.

Figure 2:
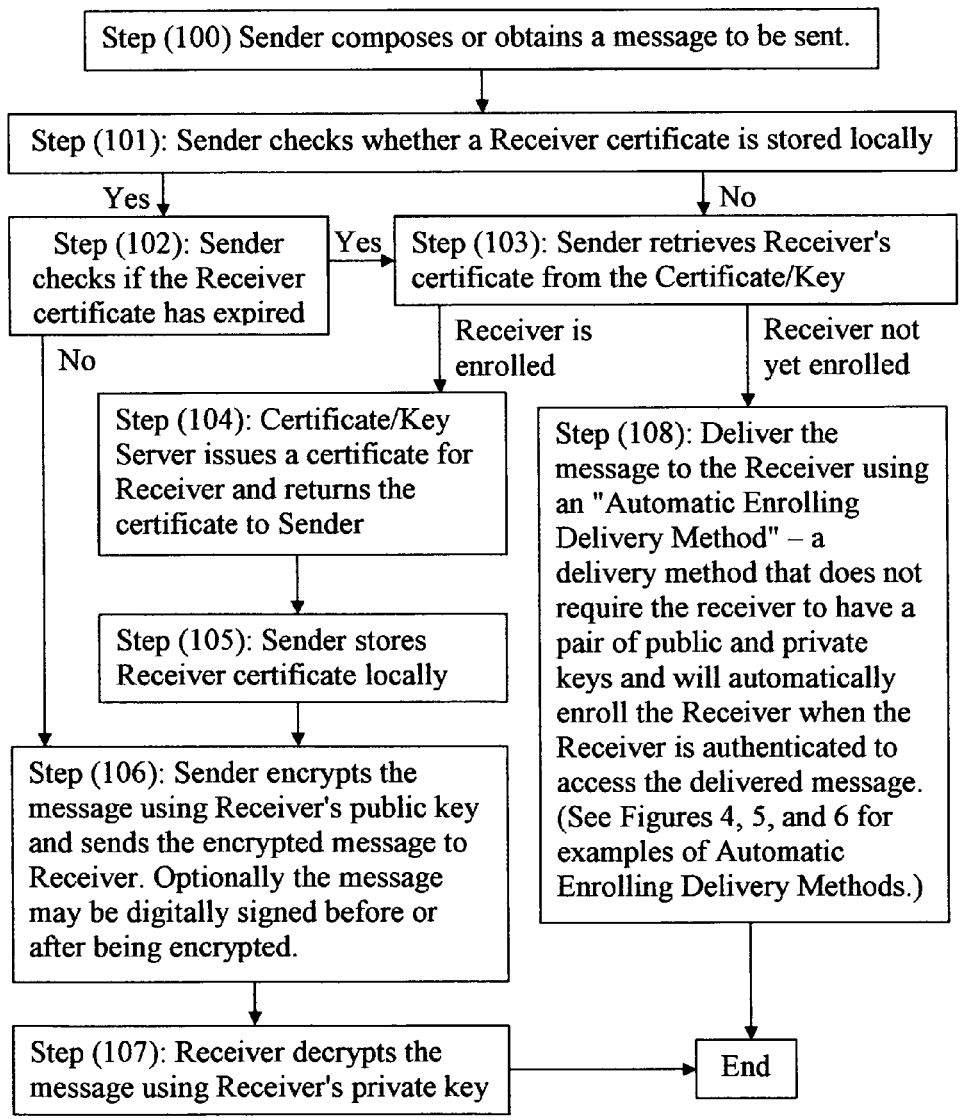
FIG. 2 shows a process of sending and receiving a secure message that will use public key encryption for recipients already enrolled and will cause recipients not yet enrolled to be enrolled after receiving the first message.
Figure 3:
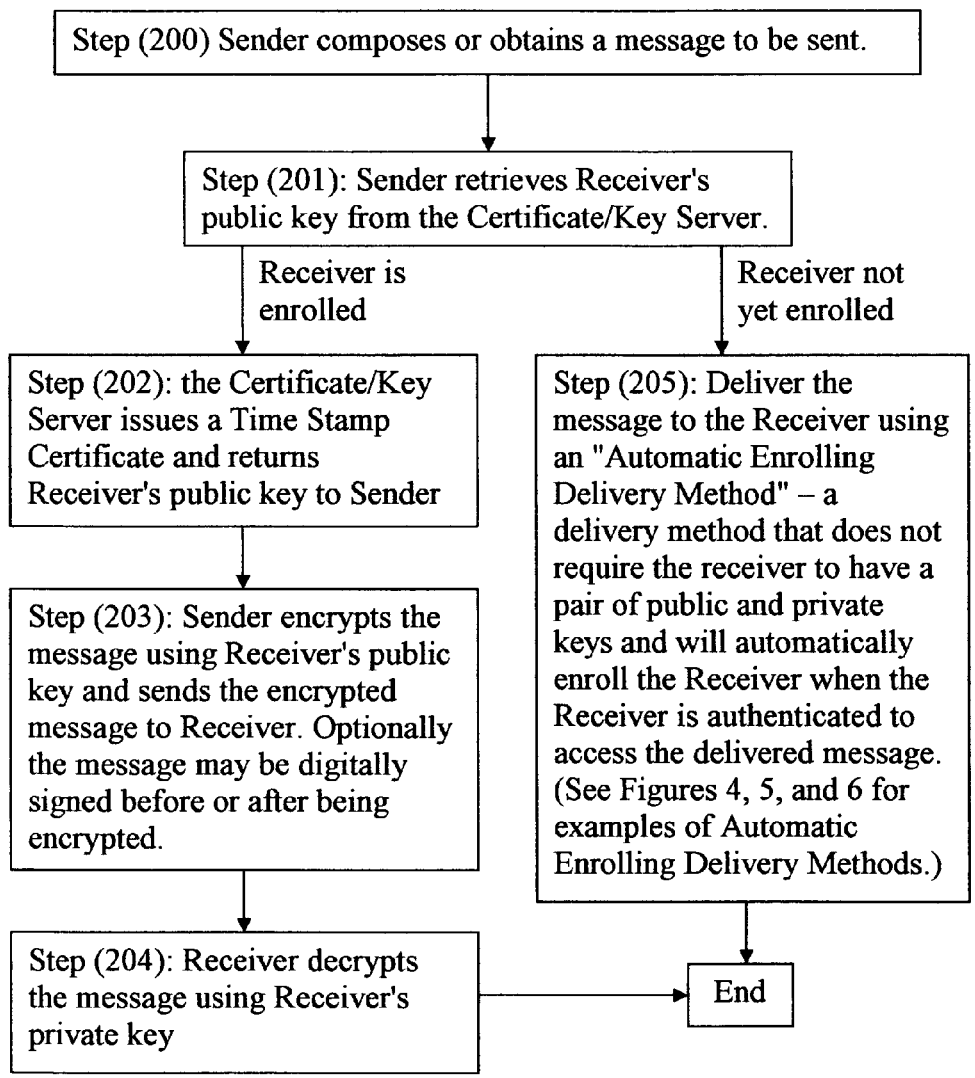
FIG. 3 shows an alternative implementation of the process shown in FIG. 2, in which the recipient's public key is retrieved each time the message is sent.

FIG. 2 shows the process of sending and receiving a secure message and FIG. 3 shows an alternative process. These processes always allow a secure message to be sent regardless of whether the Receiver is enrolled. If the Receiver (40) is enrolled, the Receiver's public key will be available and standard public key encryption will be used to encrypt the message. If the Receiver (40) is not enrolled, the first message will be sent using a secure delivery method that does not require the recipient to have a public key. However, when the Receiver (40) is authenticated to access the first message, a pair of public and private keys will be automatically generated and the Receiver (40) will become enrolled. Once the Receiver (40) is enrolled, subsequent messages will be sent to the Receiver (40) using standard public key encryption. In the process shown in FIG. 3, the Receiver's public key is retrieved from the Certificate/Key Server (30) each time a message is sent. The advantage of such implementation is that it always guarantees that the current Receiver's public key is used for encrypting the message. In addition, every message is automatically time-stamped. On the other hand, the process shown in FIG. 2 will store the Receiver's certificate locally. The Sender (20) will only retrieve the certificate from the Certificate/Key Server (30) when an unexpired Receiver certificate can not be found locally. The advantage of such an implementation is that it greatly reduces the load of Certificate/Key Server (30), because the certificate does not have to be retrieved each time a message is sent.

FIG. 2 shows a process of sending and receiving secure messages with automatic recipient enrollment. The process starts at Step (100): the Sender (20) composes or otherwise obtains a message to be sent. In one implementation, the Sender (20) is a desktop computer and the message is composed at the Sender (20). In an alternative implementation, the Sender (20) is a server at the gateway of an internal network of an organization and the message is received from a desktop computer within the internal network.

At Step (101), the Sender (20) checks if a Receiver certificate is stored locally. If a Receiver certificate is stored locally, the Sender (20) further checks whether the certificate is expired at Step (102). If the certificate is not stored locally or the certificate has expired, the process goes to Step (103) to retrieve the Receiver's certificate from the Certificate/Key Server (30). If an unexpired Receiver certificate is stored locally, it indicates that the Receiver (40) is enrolled and the process goes to Step (106).

At Step (103), the Sender (20) retrieves the Receiver's certificate from the Certificate/Key Server (30). If the Receiver (40) is enrolled, the Receiver's public key or certificate will be available at the Certificate/Key Server (30) and the process will go to Step (104). Otherwise, if the Receiver (40) is not yet enrolled, the process goes to Step (108).

At Step (104), the Certificate/Key Server (30) issues a certificate for the Receiver (40) and returns the certificate to the Sender (20). The certificate can be a digital certificate that contains the Receiver's identity and/or email address, the Receiver's public key, and a validity period. The certificate is digitally signed by the Certificate/Key Server (30) and the digital signature can be verified using the public key of the Certificate/Key Server (30). The public key of the Certificate/Key Server (30) can be in turn certified by a root certificate. The public key for verifying the root certificate can be stored locally or hard-coded into the computer software at the Sender (20) and the Receiver (40). In an alternative implementation, the Receiver certificate is not issued by the Certificate/Key Server (30). Instead, the certificate is issued by an external certification authority (CA) and the Certificate/Key Server (30) simply stores the certificate to allow the Sender (20) to retrieve it.

At Step (105), the Sender (20) receives the Receiver certificate from the Certificate/Key Server (30) and stores the certificate locally. After that, the process continues to Step (106). The Sender (20) may verify the integrity and authenticity of the certificate by verifying the digital signatures on the Receiver certificate and the root certificate before storing the certificate and continuing to Step (106).

At Step (106), the Sender (20) encrypts the message using the Receiver's public key contained in the Receiver certificate and sends the encrypted message to the Receiver (40). In one implementation, the message is encrypted using a symmetric key encryption algorithm, such as AES (Advanced Encryption Algorithm), with a randomly generated symmetric key, and a public key encryption algorithm, such as RSA, is used to encrypt the symmetric key. Optionally, the Sender (20) may digitally sign the message using the Sender Private Key (25) before or after the message is encrypted. In one implementation, a one-way hash function, such as SHA-1, is used for computing a hash from the message to be signed, and a digital signature algorithm, such as the RSA digital signature algorithm, is used for creating a digital signature on the hash. A Sender's certificate and a root certificate may be attached to the signed message for verification purposes. After Step (106), the process continues to Step (107).

At Step (107), the Receiver (40) receives the encrypted message and decrypts it using the Receiver Private Key (45). Optionally, if the message is digitally signed, the Sender's digital signature can be verified using the Sender's public key. The Sender's certificate and the root certificate can also be verified to ensure that the Sender's public key used in verifying the digital signature is authentic. After Step (107), the process ends.

Step (108) is carried out only when the Receiver (40) is not yet enrolled. At this step, the message will be delivered to the Receiver (40) using an "Automatic Enrolling Delivery Method"—a delivery method that does not require the Receiver to have a pair of public and private keys and will automatically enroll the Receiver when it is authenticated to access the message. Some examples of Automatic Enrolling Delivery Method will be shown in FIGS. 4, 5, and 6. Please note that only the first message to a Receiver (40) will be sent using the delivery method of Step (108). After the Receiver (40) is authenticated to access the first message, the Receiver (40) will become enrolled and subsequent messages will be sent to the Receiver (40) using the standard public-key encryption method as described in Steps (106) and (107). After Step (108), the process ends.

FIG. 3 shows an alternative implementation of the process of sending and receiving a secure message. The process starts at Step (200) which can be identical to Step (100) in FIG. 2. However, after being started, the process directly goes to Step (201) to retrieve the Receiver's public key from the Certificate/Key Server (30) without checking whether a Receiver certificate is stored locally and whether the certificate has expired. If the Receiver (40) is not yet enrolled, the process goes to Step (205) which can be identical to Step (108) in FIG. 2. After Step (205), the process ends. If the Receiver (40) is already enrolled, the process goes on to Step (202).

At Step (202) the Certificate/Key Server (30) issues a "Time Stamp Certificate" (TSC) and returns it to the Sender (20) along with the Receiver's public key. In one implementation, the TSC includes a hash of the Sender's email address, a hash of the Sender's public key, a hash of the Receiver's email address, a hash of the Receiver's public key, the time, and a hash of the message. The TSC is digitally signed by the Certificate/Key Server (30) and the digital signature can be verified using the public key of the Certificate/Key Sever (30). The public key of the Certificate/Key Server (30) can in turn be certified by a root certificate. The public key for verifying the root certificate can be stored locally or hard-coded into the computer software at the Sender (20) and the Receiver (40).

After the Certificate/Key Server (30) issues a TSC and returns the Receiver's public key to the Sender (20), the process continues to Step (203), where the message can be optionally signed, encrypted, and sent to the Receiver (40). Step (203) can be identical to Step (106) in FIG. 2, except a "Time Stamp Certificate" may be attached to the signed message in place of the Sender's certificate for verification purposes. The process then continues to Step (204) for the Receiver (40) to decrypt the received message using the Receiver Private Key (45). Step (204) can be identical to Step (107) in FIG. 2, except the "Time Stamp Certificate" instead of the Sender's certificate may be verified, if the message is signed. After Step (204), the process ends.

FIG. 4 shows an example of "Automatic Enrolling Delivery Method." The delivery method can be used in Step (108) of FIG. 2 or Step (205) of FIG. 3. The process is started if Step (103) of FIG. 2 or Step (201) of FIG. 3 determines that the Receiver (40) is not yet enrolled. Once started, the process goes to Step (300).

At Step (300), after determining that the Receiver (40) is not yet enrolled (does not have a public key in the Certificate/Key Server (30)), the Certificate/Key Server (30) generates a symmetric key and a "first time password," sends the symmetric key to the Sender (20), sends the first time password to the Receiver (40) using email, and stores both the symmetric key and the first time password associated with the Receiver's identity, such as the email address. The symmetric key will be used for encrypting the message, and the first time password will be used for authenticating the Receiver (40). In one implementation, the symmetric key may be sent to the Sender (20) in a secure fashion. For example, it can be encrypted using the Sender's public key, and the Sender (20) can decrypt it using the Sender Private Key (25). After Step (300), the process continues to Step (301).

At Step (301), the Sender (20) receives the symmetric key from the Certificate/Key Server (30), uses the symmetric key to encrypt the message, and sends the encrypted message to the Receiver (40). Optionally, the Sender (20) may compute a hash of the symmetric key and send the hash to the Receiver (40) along with the encrypted message. The advantage of including a hash of the symmetric key will be discussed later. After Step (301), the process continues to Step (302).

At Step (302), after receiving the encrypted message, the Receiver (40) downloads and installs software programs that implement the Receiver Process (44) and optionally Sender Process (24), if such software programs are not already installed. The instructions for where to download and how to install the software programs can be sent to the Receiver (40) along with the encrypted message or the first time password. Such instructions can also be sent to the Receiver (40) in a separate message. After necessary software programs are installed, the Receiver (40) will use the software programs to generate a pair of public and private keys. After that, the process continues to Step (303).

At Step (303), the Receiver (40) stores the generated private key locally as the Receiver Private Key (45) and sends the corresponding public key to the Certificate/Key Server (30) along with the first time password. Optionally, the hash of the symmetric key can also be sent to the Certificate/Key Server (30) if such a hash is included in Step (301). In one implementation, the private key can be stored securely. For example, it can be encrypted using a symmetric key derived from a pass phrase. The process then continues to Step (304).

At Step (304), the Certificate/Key Server (30) checks if the first time password and optionally the hash of the symmetric key sent from the Receiver (40) are correct. If so, the Certificate/Key Server (30) stores the Receiver's public key associated with the Receiver's email address and sends the symmetric key generated at Step (300) to the Receiver (40). The process then goes to Step (305).

At Step (305), the Receiver (40) decrypts the message using the symmetric key received from the Certificate/Key Server (30). After that, the process ends.

When the above process finishes, the Receiver (40) becomes enrolled. It will contain a Receiver Process (44), a Receiver Private Key (45), and optionally a Sender Process (24). The corresponding public key will also be stored in the Certificate/Key Server (30) so that the Sender (20) will find that the Receiver (40) is enrolled when sending the next message. Subsequent messages, therefore, will be sent to the Receiver (40) using standard public-key encryption.

As discussed above, an optional hash of the symmetric key may be sent along with the encrypted message at Step (301). The advantage of implementing such an option is that when the hash of the symmetric key is submitted to the Certificate/Key Server (30) along with the first time password at Step (303), it proves that the Receiver (40) has received both the encrypted message and the first time password. Otherwise, the Receiver (40) can only prove that it has received the first time password but cannot prove that it has received the encrypted message. The authentication of the Receiver (40) will be stronger if the Receiver (40) is required to prove that it can receive both the encrypted message and the first time password. The encrypted message and the first time password are usually sent from different sources, one from the Sender (20) and one from the Certificate/Key Server (30), and they usually travel different routes over the Internet. For this reason, the chance that both the encrypted message and the first time password are intercepted by an imposter is smaller. Including a hash of the symmetric key with the encrypted message is only one way to provide proof that the Receiver (40) is able to receive the encrypted message. Many alternative ways are possible. For example, a random number instead of a hash of the symmetric key can be sent to the Receiver (40) along with the encrypted message. The random number may be stored in the Certificate/Key Server (30) and used for verification at Step (304). Another alternative is used in the processes shown in FIGS. 7 and 8, which will be described in detail below. Virtually any method that provides evidence that the Receiver (40) is able to receive a message from the Sender (20) can be used in place of or in addition to sending a hash of the symmetric key along with the encrypted message. More generally, any method that provides evidence that the Receiver (40) is able to receive messages sent from at least two different sources can be used for stronger authentication.

FIG. 5 shows an alternative example of "Automatic Enrolling Delivery Method." This alternative uses identity-based encryption (IBE) for sending the first message to the Receiver (40) before it is enrolled. The delivery method can be used in Step (108) of FIG. 2 or Step (205) of FIG. 3. The process is started if Step (103) of FIG. 2 or Step (201) of FIG. 3 determines that the Receiver (40) is not yet enrolled. Once started, the process goes to Step (400).

At Step (400), the Sender (20) encrypts the message using an identity-based encryption (IBE) method and sends the encrypted message to the Receiver (40). The IBE method does not require the Receiver (40) to have a pair of public and private keys prior to sending the message, because the message can be encrypted using the identity of the Receiver (40), such as the Receiver's email address. After Step (400), the process continues to Step (401).

At Step (401), after receiving the encrypted message, the user downloads software programs that implement the Receiver Process (44) and optionally the Sender Process (24) and installs these software programs into the Receiver (40), if such software programs are not already installed. The instructions for where to download and how to install the software programs can be sent to the Receiver (40) along with the encrypted message or the first time password. Such instructions can also be sent to the Receiver (40) in a separate message. After necessary software programs are installed, the Receiver (40) will use the software programs to generate a pair of public and private keys. After that, the process continues to Step (402).

At Step (402), the Receiver (40) stores the private key locally as the Receiver Private Key (45) and sends the corresponding public key to the Certificate/Key Server (30) along with authentication information to prove the Receiver's identity. The authentication information can be any type of information to authenticate the identity of the Receiver (40). For example, it can be any type of authentication information typically sent to an IBE key server for obtaining the IBE private key. It can also simply be a "first time password" sent from the Certificate/Key Server (30) to the Receiver's email address. In addition to the first time password, the authentication information can also include a secret, such as a random number, sent along with the message encrypted using IBE to prove that the Receiver (40) can receive both the first time password sent from the Certificate/Key Server (30) and the encrypted message sent from the Sender (20). Other methods that can prove that the Receiver (40) is able to receive messages sent from at least two different sources can also be used for authentication purpose. In one implementation, the private key can be stored securely. For example, it can be encrypted using a symmetric key derived from a pass phrase. The process then continues to Step (403).

At Step (403), the Certificate/Key Server (30) verifies the authentication information received from the Receiver (40), and if verified, the Certificate/Key Server (30) stores the Receiver's public key associated with the Receiver's identity, such as the email address, generates the Receiver's IBE private key using the IBE master secret, and sends the Receiver's IBE private key to the Receiver (40). The process then continues to Step (404).

At Step (404), the Receiver (40) decrypts the message using the Receiver's IBE private key received from the Certificate/Key Server (30). After that, the process ends. Please note that the IBE private key generated is only used to decrypt the first message. After receiving the first message, the Receiver (40) will become enrolled and will have a pair of standard public and private keys. Subsequent messages sent to the Receiver (40) will be encrypted using standard public-key encryption, which is intrinsically more secure than IBE, because no master secret exists that can derive everybody's private key.

FIG. 6 shows a third alternative example of "Automatic Enrolling Delivery Method." This alternative uses a web-based delivery for sending the first message to the Receiver (40). The delivery method can be used in Step (108) of FIG. 2 or Step (205) of FIG. 3. The process is started if Step (103) of FIG. 2 or Step (201) of FIG. 3 determines that the Receiver (40) is not yet enrolled. Once started, the process goes to Step (500).

At Step (500), the Sender (20) encrypts the message for a Delivery Server and sends the encrypted message to the Delivery Server. For example, the message can be encrypted using a public key of the Delivery Server. After Step (500), the process continues to Step (501).

At Step (501), the Delivery Server decrypts and stores the message and sends an email notification and a "first time password" to the Receiver (40). In one implementation, the notification and the first time password may be sent in one email message. In an alternative implementation, the notification and the first time password may be sent in separate emails. Preferably, the notification and the first time password are sent through different servers at different locations. In this way, the two messages will travel different routes and the chance that they are both intercepted by the same potential imposter will be reduced. The notification may contain a secret code. For example, the notification may contain a URL to access the message, and the secret code may be part of the URL. Other methods that can prove that the Receiver (40) is able to receiver messages sent from at least two different sources can also be used for authentication purpose. After Step (501), the process continues to Step (502).

At Step (502), after receiving the notification and first time password, the Receiver (40) accesses the message stored at the Delivery Server using the Web Browser (46) through SSL. For example, the user at the Receiver (40) may click the URL that contains the secret code to launch the Web Browser (46) to connect to the Delivery Server using SSL (Secure Socket Layer). The Delivery Server will return a web page asking the user to enter the first time password to access the message. After the browser sends the first time password entered by the user to the Delivery Server, the process continues to Step (503).

At Step (503), the Delivery Server verifies that the secret code and the first time password received from the browser are correct. If so, the Receiver is authenticated and the Delivery Server will return a web page that contains an ActiveX or an applet. The ActiveX or applet will be automatically downloaded and installed at the Receiver (40), if not already installed. The process then continues to Step (504).

At Step (504), the ActiveX or applet generates a pair of public and private keys, stores the private key locally as the Receiver Private Key (45), and sends the public key to the Certificate/Key Server (30) along with certain authentication information. The authentication information can be the original secret code and the first time password used for authenticating the Receiver (40) at Step (503) or any secret information that becomes available to the Receiver (40) when it is authenticated at Step (503), such as a cookie or a session ID returned from the Certificate/Key Server (30) at Step (503) under SSL. If the authentication information is correct, the Certificate/Key Server (30) will store the public key associated with the Receiver's email address to make the Receiver (40) enrolled. In one implementation, the private key may be stored at the Receiver (40) securely. For example, it can be encrypted using a symmetric key derived from a pass phrase. In one implementation, the ActiveX or applet itself may contain all components that implement the Receiver Process (44) and optionally the Sender Process (24). Alternatively, some or all of these components may be downloaded and installed as a separate software program or several software programs by the ActiveX or applet. After the ActiveX or applet finishes its job, the content of the message will be displayed in the Web Browser (46). After that, the process ends.

FIGS. 4, 5, and 6 have shown three specific examples of the Automatic Enrolling Delivery Method that can be used in Step (108) of FIG. 2 or Step (205) of FIG. 3. Such a delivery method allows a first message to be sent to a Receiver not yet enrolled and will automatically enroll the Receiver when the Receiver is authenticated to access the first message. These specific examples are not the only possible implementations and should not be construed to limit the scope of the invention. Virtually any delivery method that does not require the Receiver (40) to have a pair of public and private keys prior to sending the message can be used to deliver the first message and can be modified so that when the Receiver (40) is authenticated to access the first message, a pair of public and private keys is automatically generated at the Receiver (40) and the public key is automatically posted to a Certificate/Key Server (30) to make the Receiver (40) enrolled. In fact, FIGS. 7 and 8 will provide a fourth alternative implementation of the Automatic Enrolling Delivery Method that can be used in Step (108) of FIG. 2 or Step (205) of FIG. 3, as will be discussed in detail later.

Figure 7:
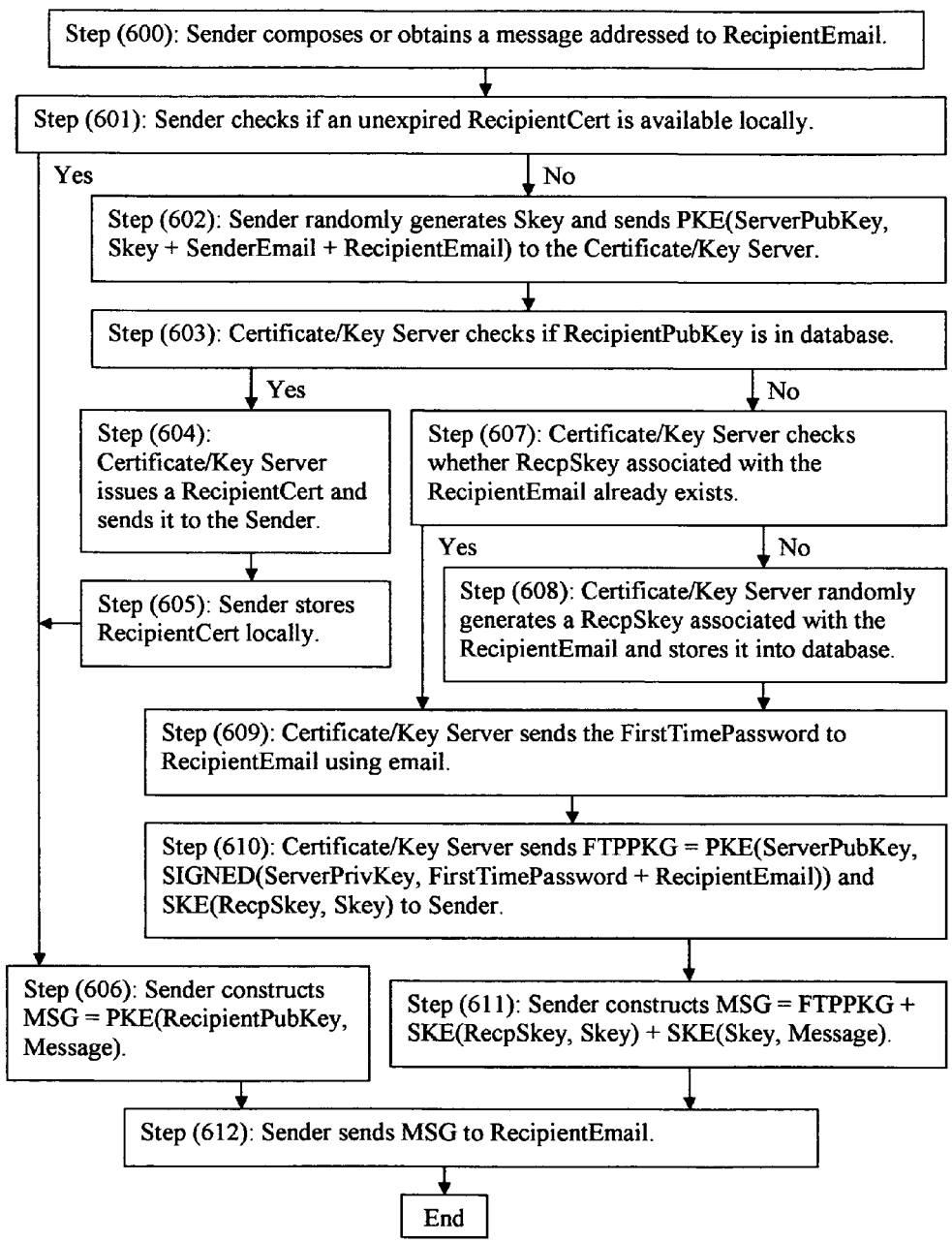
FIG. 7 shows an example implementation of the sending process with some practical considerations.
Figure 8:
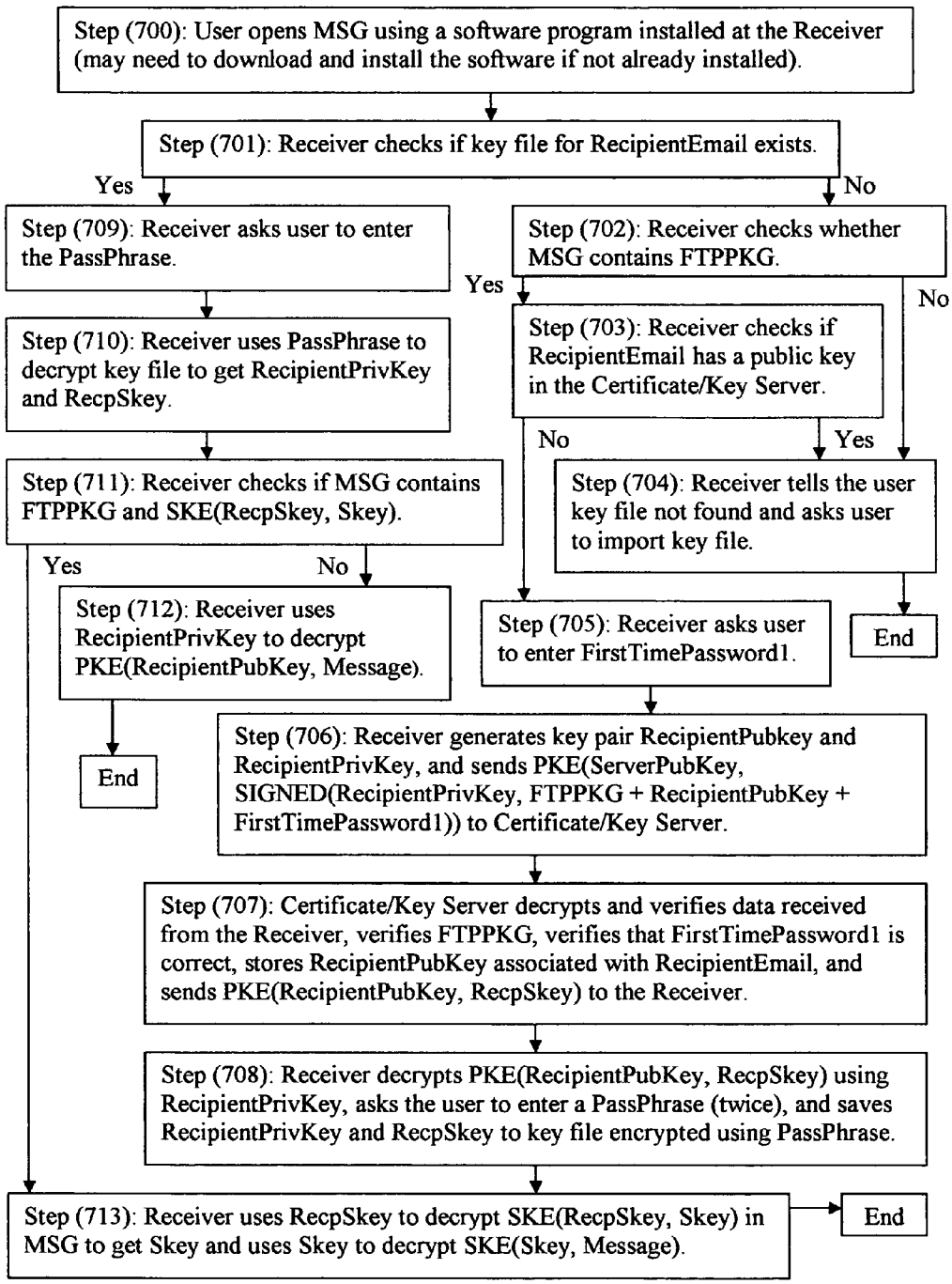
FIG. 8 shows an example implementation of the receiving process with some practical considerations.

While the above descriptions and FIGS. 2, 3, 4, 5, and 6 have provided several embodiments to allow one skilled in the art to implement the present invention in several ways, many practical considerations need to be addressed in the actual implementation. FIG. 7 and FIG. 8 show one example implementation of the present invention with several practical considerations. For the reason of descriptive clarity, FIGS. 7 and 8 and the related descriptions will contain specific details. Those specific details should not be construed to limit the scope of the present invention. In stead, they should be taken as an example to demonstrate how these practical considerations can be addressed in a specific implementation of the present invention. Those skilled in the art will be able to address these and other practical considerations in a similar fashion after studying FIGS. 7 and 8 and the related descriptions. The following lists some of the practical considerations addressed in the design shown in FIGS. 7 and 8.

1) How should the system behave if, after the Receiver is already enrolled, the first message that caused the automatic enrollment is opened again? A reasonable to behavior of the system is that, after a Receiver becomes enrolled by opening a message, re-opening the same message should not cause the automatic enrolling process to be executed again. For example, after the user has entered the first time password and selected a pass phrase to protect the private key when opening the message for the first time, the user should not be able to open the message again using the first time password. Instead, the user must enter the selected pass phrase to re-open the message. It is intuitive that a "first time password" can only be used for the first time.

2) How should the system behave if, after a first message is sent to a Receiver not yet enrolled, one or more messages are sent to the same Receiver from the same Sender or other Senders before the Receiver accesses the first message to become enrolled? In such a case, the Receiver may receive several messages sent using the Automatic Enrolling Delivery Method. A reasonable behavior of the system is that the Receiver will become enrolled when any of these messages sent before the enrollment is opened. However, after the Receiver becomes enrolled by opening one of these messages, the enrollment process should not be executed again, and the Receiver should be able to open all messages in the same way regardless of whether the message is sent before or after the enrollment. For example, if the user has entered a first time password and selected a pass phrase to protect the private key file when opening one of the messages sent before the enrollment, the user will become enrolled and the first time passwords cannot be used any more. Instead, the user should be able to open all messages by entering the selected pass phrase regardless of whether the message is sent to the Receiver before or after the enrollment.

3) How should the system behave if, after being enrolled by opening the first message on one computer, the user uses another computer to open the same message or other messages sent before the enrollment? In this case, the message cannot be opened because the private key file is not there. A reasonable behavior of the system is that it will tell the user that he/she must import the key file from the computer where he/she becomes enrolled in order to continue.

FIGS. 7 and 8 will demonstrate how these desired system behaviors can be implemented without causing user inconveniences or compromising security. They also demonstrate how the data security, integrity, and authentication in the communications between the Sender, the Receiver, and the Certificate/Key Server can be protected.

Before discussing the details of FIG. 7 and FIG. 8, a few symbols and formulas used in these figures and related descriptions need to be defined.

"PKE(publickey, data)" represents "data" encrypted using "publickey" according to a public key encryption algorithm, such as RSA. It usually includes a randomly generated symmetric key encrypted using "publickey" and "data" encrypted using the symmetric key. "PKE(publickey, data)" can also represent "data" directly encrypted using "publickey", if "data" is small enough.

"SKE(symmetrickey, data)" represents "data" encrypted using "symmetrickey" according to a symmetric key encryption algorithm, such as AES.

"HASH(data)" represents the hash value computed from "data" using a cryptographically secure hash function, such as SHA-1.

"SIGNED(privatekey, data)" represents "data" signed using "privatekey" according to a digital signature algorithm, such as DSA. It includes the "data" itself and the digital signature attached. The digital signature can be computed on the hash of "data" (HASH(data)), or on "data" itself if "data" is small enough.

"+" indicates that two data items are appended together. For example, "data1+data2" represents "data1" appended with "data2." The order of the two data items is not important except it must be fixed to allow proper signature verification, if the result is signed.

"Message" is the message to be sent to the Receiver. Optionally, it can be signed by the digital signature of the Sender.

"RecipientEmail" is the email address of the Receiver.

"RecipientPubKey" and "RecipientPrivKey" represent the public key and the corresponding private key of the Receiver.

"ServerPubKey" and "ServerPrivKey" represents the public key and the corresponding private key of the Certificate/Key Server.

"Skey" is a symmetric key for encrypting the message before the Receiver is enrolled. It is randomly generated each time a message needs to be encrypted.

"FirstTimePassword" is a password sent to RecipientEmail for authenticating the Receiver when a message is sent to the Receiver before the Receiver is enrolled.

"FirstTimePassword1" is the password the user enters into the Receiver when opening the message sent to the Receiver before the Receiver is enrolled. "FirstTimePassword1" must match "FirstTimePassword" for the Receiver to access the message and become enrolled.

"PassPhrase" is a password or a phrase chosen by the user to protect the private key file. It will be used to derive a symmetric key which is used to encrypt the user's private key in the private key file.

"RecpSkey" is a Receiver specific symmetric key. In other words, each RecipientEmail will have a specific RecpSkey. The RecpSkey for different RecipientEmail will be different. RecpSkey is used to encrypt the Skey, and SKE(RecpSkey, Skey) will be included in all messages sent to the Receiver before the Receiver is enrolled. RecpSkey will be included in the key file protected by the PassPhrase after the Receiver is enrolled. RecpSkey is used for implementing the desired behavior mentioned in the practical consideration 2) above.

"RecipientCert" is a digital certificate of the Receiver. One example of RecipientCert is: RecipientCert=SIGNED(ServerPrivKey, RecipientPubKey+RecipientEmail+ValidityPeriod+RootCert); where ValidityPeriod indicates the time period in which the RecipientCert is valid.

"RootCert" is a root certificate for certifying ServerPubKey. In one implementation: RootCert=SIGNED(RootPrivKey, ServerPubKey+RootCertValidityPeriod); where "RootPrivKey" is the root private key for signing the RootCert. The corresponding root public key "RootPubKey" can be hard coded into every Sender and Receiver for verification of the RootCert. The verification ensures that ServerPubKey in the RootCert is authentic. RootCertValidityPeriod is the time period the RootCert is valid.

Referring now to FIG. 7, the diagram shows an example implementation of the sending process with practical considerations discussed above. The process starts at Step (600), when the user finishes composing a message addressed to RecipientEmail and clicks the "Send" button. Optionally, the message can be digitally signed. In this case, the user needs to enter a PassPhrase before clicking the "Send" button. The PassPhrase will be used to decrypt the private key file. The private key file contains the Sender Private Key (25) which can be used to digitally sign the message. In an alternative implementation, the Sender (20) is a server computer at the gateway of the internal network of an organization. The message is not composed at the Sender (20). Instead, it is composed at a computer inside the network and sent to the Sender (20) at the gateway. After Step (600), the process continues to Step (601).

At Step (601), the Sender (20) checks if an unexpired RecipientCert is available locally. If so, the process goes to Step (606) to encrypt the message using the RecipientPubKey. Otherwise, the process goes to Step (602).

At Step (602), the Sender (20) randomly generates a symmetric key, Skey, and sends PKE(ServerPubKey, Skey+SenderEmail+RecipientEmail) to the Certificate/Key Server (30) to retrieve a new RecipientCert. ServerPubKey can be obtained from a RootCert stored locally and the RootCert can be verified using the hard-coded RootPubKey to ensure that the ServerPubKey is authentic. If the RootCert cannot be found locally or is expired, the Sender (20) may retrieve the most up-to-date RootCert from the Certificate/Key Server (30). The locally stored RootCert may be updated whenever the Sender (20) receives a message from the Certificate/Key Server (30) that contains a newer RootCert. After Step (602), the process then continues to Step (603).

At Step (603), the Certificate/Key Server (30) decrypts PKE(ServerPubKey, Skey+SenderEmail+RecipientEmail) sent from the Sender (20) and then checks if RecipientPubKey associated with RecipientEmail is stored in the database. If so, the process goes to Step (604). Otherwise, the process goes to Step (607).

At Step (604), the Certificate/Key Server (30) issues a ReceipientCert and sends it to the Sender (20). The process then continues to Step (605).

At Step (605), the Sender (20) stores the RecipientCert locally. The Sender (20) may verify that RecipientCert is authentic before storing it locally. The verification can include verifying the RootCert using the hard-coded Root-PubKey to ensure that the RootCert is authentic, verifying the digital signature of the Certificate/Key Server (30) on the RecipientCert using the ServerPubKey contained in the Root-Cert, comparing the current time with the ValidityPeriod in the RecipientCert to ensure that it is not expired, and comparing the current time with RootCertValidityPeriod to ensure that the RootCert is not expired. After Step (605), the process goes to Step (606).

At Step (606), the Sender (20) uses RecipientPubKey to encrypt the message to construct: MSG=PKE(RecipientPubKey, Message). The Message is usually large so that it is necessary to use RecipientPubKey to encrypt a randomly generated symmetric key, and then use the symmetric key to encrypt the Message. In this case, the symmetric key must be randomly generated again. It should not be the same Skey sent to the Certificate/Key Server (30) at Step (602) above. After Step (606), the process goes to Step (612) to send the encrypted message to RecipientEmail.

At Step (607), the Certificate/Key Server (30) checks whether a RecpSkey associated with RecipientEmail already exists. If not, the Certificate/Key Server (30) will execute Step (608) to randomly generate a symmetric key, RecpSkey, associated with the RecipientEmail and store it into the database. Then the process goes to Step (609). If there is already an RecpSkey associated with RecipientEmail, the process directly goes to Step (609). RecpSkey is used for implementing the desired behavior mentioned in the practical consideration 2) above.

At Step (609), the Certificate/Key Server (30) sends FirstTimePassword to RecipientEmail using email. FirstTimePassword may be randomly generated each time so that the FirstTimePassword for each message sent to Receiver (40) before the enrollment will be different. Alternatively, the FirstTimePassword may be generated only once for a RecipientEmail and re-used for the same RecipientEmail if another message is sent to the same Receiver (40) before the enrollment. The FirstTimePassword can also be generated each time but will always be the same for the same RecipientEmail. For example, it can be generated according to: FirstTimePassword=HASH(RecipientEmail+MasterSecret); where MasterSecret is a secret known only to the Certificate/Key Server (30). After sending the FirstTimePassword to RecipientEmail, the process continues to Step (610).

At Step (610), the Certificate/Key Server (30) constructs a "first time password package": FTPPKG=PKE(ServerPubKey, SIGNED(ServerPrivKey, FirstTimePassword+RecipientEmail)) and sends FTPPKG+SKE(RecpSkey, Skey) to the Sender (20). FTPPKG is constructed by first signing FirstTimePassword+RecipientEmail using ServerPrivKey and then encrypting the result using the ServerPubKey. FTPPKG contains the FirstTimePassword but it is hidden from the Sender (20) because it is encrypted by the ServerPubKey. The signed portion: SIGNED(ServerPrivKey, FirstTimePassword+RecipientEmail) protects the association between the FirstTimePassword and RecipientEmail to ensure that such an association cannot be tampered with. After FTPPKG+SKE(RecpSkey, Skey) is sent to the Sender (20), the process continues to Step (611).

At Step (611), the Sender (20) constructs the encrypted message to be sent to the Receiver (40): MSG=FTPPKG+SKE(RecpSkey, Skey)+SKE(Skey, Message). Please note that the MSG constructed at Step (611) is different from the MSG constructed at Step (606). The MSG is constructed according to Step (606) when the Receiver is already enrolled. The MSG constructed at Step (611), however, is for a Receiver not yet enrolled. After constructing the MSG, the process goes to Step (612).

At Step (612), the Sender (20) sends the MSG constructed at either Step (606) or Step (611) to the Receiver (40). MSG, which is primarily encrypted data in binary form, can be sent as an attachment file in an email message to the Receiver (40). The text portion of the email message may contain instructions on how to open the attachment. In particular, if the MSG is constructed at Step (611) for a Receiver not yet enrolled, the text portion of the email message may contain instructions on where to download the software and how to install it in order to open the attachment. The text portion may also tell the recipient that a first time password for opening the attachment has been sent to the recipient email address in a separate email message. After this step, the sending process ends.

FIG. 8 shows the corresponding receiving process. The process starts at Step (700) after the Receiver (40) receives the MSG sent to RecipientEmail at Step (612) of FIG. 7. At Step (700), the user opens MSG received using a software program installed at the Receiver (40). The software program will be responsible for carrying out the rest of the Receiver portion of the process of FIG. 8. The user may need to download and install the software program if it is not already installed. In one implementation, the software program is installed as a plug-in of an email client, such as a Microsoft Outlook extension. In such an implementation, the user clicks a special button linked to the plug-in to open the MSG. In an alternative implementation, a stand-alone software program is installed and is associated with the file extension of the MSG attachment. In such an implementation, the user can click or double click the attachment and the software program will be launched to open the attachment. After this step, the process goes to Step (701).

At Step (701), the Receiver (40) checks if a key file associated with the RecipientEmail can be found at the Receiver (40). If so, the Receiver (40) is already enrolled and the process goes to Step (709). Otherwise, the process goes to Step (702).

At Step (702) the Receiver (40) checks whether the MSG contains FTPPKG. If so, the MSG is sent before the Receiver becomes enrolled and the process goes to Step (703). If the MSG does not contain FTPPKG, it indicates that the Receiver (40) is already enrolled. However, because the key file is not found, the Receiver (40) must have been enrolled using a different computer. In this case, the process goes to Step (704) to tell the user that he/she must import the key file from the computer where he/she became enrolled in order to open the MSG on the current computer.

At Step (703), the Receiver (40) checks if there is already a RecipientPubKey associated with RecipientEmail stored at the Certificate/Key Server (30). The check can be conducted by trying to retrieve a RecipientCert from the Certificate/Key Server (30). If a RecipientPubKey associated with RecipientEmail already exists on the Certificate/Key Server (30), it indicates that the Receiver (40) is already enrolled. However, because the corresponding key file is not found on the current computer, the Receiver must have been enrolled using a different computer. In this case, the process also goes to Step (704) to tell the user that he/she must import the key file from the computer where he/she became enrolled in order to open the MSG on the current computer. After Step (704), the process ends. If RecipientEmail does not have an associated RecipientPubKey on the Certificate/Key Server (30), it is confirmed that the Receiver (40) is not yet enrolled. In this case, the process continues to Step (705).

At Step (705), the Receiver (40) asks the user to enter the first time password received in the email sent at Step (609) of FIG. 7. In order to distinguish the first time password entered by the user and the FirstTimePassword included in the FTP-PKG, the first time password entered by the user will be denoted as "FirstTimePassword1." After obtaining the FirstTimePassword1, the process continues to Step (706).

At Step (706), the Receiver (40) generates a pair of public and private keys—the RecipientPubKey and the RecipientPrivKey. Then, the Receiver (40) constructs PKE(ServerPubKey, SIGNED(RecipientPrivKey, FTPPKG+RecipientPubKey+FirstTimePassword1)) and sends it to the Certificate/Key Server (30). Please note that the data FTPPKG+RecipientPubKey+FirstTimePassword1 sent to the Certificate/Key Server (30) is signed using the RecipientPrivKey. This not only provides integrity protection but also proves that the Receiver (40) has control over the RecipientPrivKey. The signed data is also encrypted using the ServerPubKey to make the communication secure. After Step (706), the process continues to Step (707).

At Step (707), the Certificate/Key Server (30) decrypts PKE(ServerPubKey, SIGNED(RecipientPrivKey, FTPPKG+RecipientPubKey+FirstTimePassword1)) using the ServerPrivKey to obtain SIGNED(RecipientPrivKey, FTPPKG+RecipientPubKey+FirstTimePassword1) and verifies SIGNED(RecipientPrivKey, FTPPKG+RecipientPubKey+FirstTimePassword1) using the RecipientPubKey. The Certificate/Key Server (30) then decrypts FTPPKG=PKE(ServerPubKey, SIGNED(ServerPrivKey, FirstTimePassword+RecipientEmail)) using the ServerPrivKey to obtain SIGNED(ServerPrivKey, FirstTimePassword+RecipientEmail) and verifies SIGNED(ServerPrivKey, FirstTimePassword+RecipientEmail) using ServerPubKey. Finally, the Certificate/Key Server (30) verifies that RecipientEmail does not already have an associated RecipientPubKey and verifies that the FirstTimePassword1 entered by the user agrees with the FirstTimePassword included in the FTPPKG. If all the verifications succeed, the Certificate/Key Server (30) stores the RecipientPubKey associated with RecipientEmail and sends PKE(RecipientPubKey, RecpSkey) to the Receiver (40). If any of the decryption and verification steps fail, the Certificate/Key Server (30) returns an error message to the Receiver (40). After Step (707), the process continues to Step (708).

At Step (708), the Receiver (40) decrypts the received PKE(RecipientPubKey, RecpSkey) using the RecipientPrivKey to obtain RecpSkey and asks the user to select and enter a PassPhrase for protecting a key file that will be used to store RecipientPrivKey and RecpSkey. The Receiver (40) may ask the user to enter the PassPhrase twice to prevent typing errors. The Receiver (40) then saves both RecipientPrivKey and RecpSkey to the key file encrypted using a symmetric key derived from the PassPhrase. The process then goes to Step (713).

If Step (701) determines that the Receiver (40) already has a key file, it indicates that the Receiver (40) is already enrolled and the process will go to Step (709). At Step (709), the Receiver (40) asks the user to enter the PassPhrase. The process then goes to Step (710).

At Step (710), the Receiver (40) uses the PassPhrase to decrypt the key file to get the RecipientPrivKey and RecpSkey. The process then continues to Step (711).

At Step (711), the Receiver (40) determines whether the MSG was sent before or after the Receiver (40) became enrolled by checking whether the MSG contains FTPPKG and SKE(RecpSkey, Skey). If the MSG was sent after the Receiver (40) became enrolled, the MSG will not contain FTPPKG and SKE(RecpSkey, Skey) and the process will go to Step (712). Otherwise, if the MSG contains FTPPKG and SKE(RecpSkey, Skey) indicating that it is a message sent before the Receiver (40) became enrolled, the process will go to Step (713).

At Step (712), the Receiver (40) uses the RecipientPrivKey to decrypt PKE(RecipientPubKey, Message) to obtain the Message, and the process ends.

At Step (713), the Receiver (40) uses the RecpSkey to decrypt SKE(RecpSkey, Skey) contained in MSG to get Skey and uses Skey to decrypt the SKE(Skey, Message) to obtain the Message. After that, the process ends.

FIGS. 7 and 8 have demonstrated how the desired system behaviors discussed in practical considerations 1) and 2) can be implemented. As shown in Step (611) of FIG. 7, every MSG sent to the Receiver (40) before the enrollment contains a SKE(RecpSkey, Skey). Therefore, if the Receiver (40) obtains RecpSkey, it will be able to decrypt every message sent to the Receiver (40) before the enrollment. RecpSkey will be returned from the Certificate/Key Server (30) at Step (707) after the Receiver (40) is authenticated to access a message sent before the enrollment. Then, at Step (708), RecpSkey will be saved into the key file encrypted using the PassPhrase. This will allow the Receiver (40) to obtain RecpSkey at Step (710) for opening the same message for the second time or opening other messages sent before the enrollment. For this reason, after the Receiver (40) becomes enrolled by opening one of the messages sent before the enrollment, the user will be able to open all messages by entering the PassPhrase regardless of whether the message was sent before or after the enrollment. The first time password can no longer be used after the enrollment because Step (707) will fail if there is already a RecipientPubKey associated with RecipientEmail. The practical consideration 3) is also addressed by Step (704) and the processing logic that leads to this step.

FIGS. 7 and 8 also demonstrated a fourth alternative implementation of an Automatic Enrolling Delivery Method that can be used in Step (108) of FIG. 2 or Step (205) of FIG. 3. More specifically, the process flow through Steps (607), (608), (609), (610), (611), (612), (705), (706), (707), (708), and (713) can be used in Step (108) of FIG. 2 or Step (205) of FIG. 3 to deliver a first message to the Receiver (40) before the enrollment and to automatically enroll the Receiver (40) when it is authenticated to access the first message. This fourth alternative is different from the first alternative shown in FIG. 4 in several places. First, instead of storing the message encryption key Skey in the Certificate/Key Server (30), a Receiver specific RecpSkey which is used to encrypt Skey is stored in the Certificate/Key Server (30). Second, instead of storing the FirstTimePassword in the Certificate/Key Server (30), it is "stored" outside of the Certificate/Key Server (30) in the FTPPKG attached to the encrypted message sent to the Receiver (40). Although stored outside, the data security and integrity is not compromised, because the FTPPKG is signed using ServerPrivKey and encrypted using the ServerPubKey. The signed and encrypted data cannot be tampered with and is only accessible to the Certificate/Key Server (30). Third, instead of using the hash of the message encryption key to prove that the Receiver (40) is able to receive the encrypted message, the FTPPKG is used to provide such proof. Both FTPPKG and FirstTimePassword1 are sent from the Receiver (40) to the Certificate/Key Server (30) at Step (706) for authentication purpose. As discussed earlier, the authentication of the Receiver (40) will be stronger if the Receiver (40) is required to prove that it can receive two messages sent from two different sources—an encrypted message sent from the Sender (20) and a first time password sent from the Certificate/Key Server (30). Because the Certificate/Key Server (30) only sends FTPPKG to the Sender (20) and FTPPKG contains signed data, the Receiver (40) cannot forge the signature and must obtain it from the Sender (20). In addition, because FTPPKG is encrypted using the public key of the Certificate/Key Server (30), the Receiver (40) cannot obtain the FirstTimePassword contained in FTPPKG and must obtain it from a separate email sent from the Certificate/Key Server (30). For these reasons, if the FTPPKG and the FirstTimePassword1 submitted to the Certificate/Key Server (30) at Step (706) are all correct, they provide a proof that the Receiver (40) is able to receive both the encrypted message sent from the Sender (20) and the FirstTimePassword sent from the Certificate/Key Server (30).

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A programmable processing system (system) is suitable for implementing or performing the apparatus or methods of the invention. The system can include a processor, a random access memory (RAM), a program memory (for example, a writable read-only memory (ROM) such as a flash ROM), a hard drive controller, a video controller, and an input/output (I/O) controller coupled by a processor (CPU) bus. The system can be preprogrammed, in ROM, for example, or it can be programmed (and reprogrammed) by loading a program from another source (for example, from a floppy disk, a CD-ROM, or another computer).

The hard drive controller is coupled to a hard disk suitable for storing executable computer programs, including programs embodying the present invention, and data.

The video controller is coupled to a video recorder, which can be used for storing and importing video footage and for writing final output.

The I/O controller is coupled by means of an I/O bus to an I/O interface. The I/O to interface receives and transmits data (e.g., stills, pictures, movies, and animations for importing into a composition) in analog or digital form over communication links such as a serial link, local area network, wireless link, and parallel link.

Also coupled to the I/O bus is a display and a keyboard. Alternatively, separate connections (separate buses) can be used for the I/O interface, display and keyboard.

Part of the functional operations described in this specification can also be executed by one or more human operators while the remaining part of the functional operations carried out by electronic or mechanical devices described above.

While this invention has been described in terms of several preferred implementations, it is contemplated that alterations, modifications and permutations will become apparent to those skilled in the art upon a reading of the specification and studying the drawings. For example, a pass phrase is used for protecting the private key file in the above descriptions. The private key file can be protected by other methods; for instance, it can be protected by the user's biometric information using a biometric device, such as a fingerprint reader or an iris scanner.

Furthermore, certain terminology has been used above for the purposes of descriptive clarity, and should not be construed to limit the above described methods or techniques. It is therefore intended that the following appended claims include all such alterations, modifications and permutations as fall within the true spirit and scope of the description presented herein.

I claim:

1. A method for sending a secure message to a receiver comprising:
   determining whether a receiver is enrolled by determining whether the receiver has a public key;
   if the receiver is enrolled and has a public key, encrypting the message using the receiver's public key and sending the encrypted message to the receiver;
   if the receiver is not enrolled and does not have a public key, sending the message to the receiver using a delivery method that does not require the receiver to have a pair of public and private keys prior to sending the message; and when the receiver accesses the message sent with the delivery method, establishing a public key for encrypting subsequent messages sent to the receiver and making the receiver enrolled.

2. The method of claim 1, wherein establishing a public key for encrypting subsequent messages sent to the receiver including generating a pair of public and private keys at the receiver and posting the public key to a key server; and determining whether a receiver has a public key including accessing the key server to retrieve the receiver's public key.

3. The method of claim 1, wherein establishing a public key for encrypting subsequent messages sent to the receiver including generating a pair of public and private keys at the receiver and posting the public key to a certificate server, and determining whether a receiver has a public key including first determining whether an unexpired receiver's certificate is available locally, and if not, accessing the certificate server to retrieve a receiver's certificate.

4. The method of claim 1, wherein the delivery method that does not require the receiver to have a pair of public and private keys prior to sending the message including using an identity-based encryption method.

5. The method of claim 1, wherein the delivery method that does not require the receiver to have a pair of public and private keys prior to sending the message including a web-based delivery method.

6. The method of claim 1, wherein the delivery method that does not require the receiver to have a pair of public and private keys prior to sending the message comprising:
   encrypting the message using a secret key;
   making the secret key accessible to a key server;
   sending the encrypted message to the receiver;
   sending the secret key from the key server to the receiver after the receiver is authenticated;
   using the secret key to decrypt the message at the receiver.

7. The method of claim 1, wherein the delivery method that does not require the receiver to have a pair of public and private keys prior to sending the message comprising:
   encrypting the message using a secret key;
   encrypting the secret key using a receiver specific key;
   storing the receiver specific key associated with the receiver at the key server;
   sending the encrypted secret key and the encrypted message to the receiver;
   sending the receiver specific key from the key server to the receiver after the receiver is authenticated;
   using the receiver specific key to decrypt the secret key;
   using the secret key to decrypt the message;
   storing the receiver specific key into an encrypted key file at the receiver.

8. The method of claim 1, wherein the receiver is authenticated to access the message using authentication information that can only be used to access the message for the first time.

9. The method of claim 8, wherein the authentication information includes a password sent to the receiver's email address and the password can only be used to access the message for the first time.

10. The method of claim 1, wherein the receiver is authenticated to access the message using evidence that the receiver can receive email messages sent from at least two different sources to the receiver's email address.

11. A secure messaging system for sending a message to a receiver comprising:
    a public-key based delivery apparatus for encrypting the message using the receiver's public key and sending the encrypted message to the receiver;
    an automatic enrolling delivery apparatus for sending the message to the receiver using a delivery method that does not require the receiver to have a pair of public and private keys prior to sending the message, and when the receiver accesses the message sent with the delivery method, establishing a public key for encrypting subsequent messages sent to the receiver and making the receiver enrolled;
    a device for determining whether the receiver is enrolled by determining whether the receiver has a public key; and
    a delivery engine for delivering the message to the receiver using the public-key based delivery apparatus if the receiver is enrolled and has a public key, or using the automatic enrolling delivery apparatus if the receiver is not enrolled and does not have a public key.

12. The system of claim 11, wherein establishing a public key for encrypting subsequent messages sent to the receiver including generating a pair of public and private keys at the receiver and posting the public key to a key server, and determining whether the receiver has a public key including accessing the key server to retrieve the receiver's public key.

13. The system of claim 11, wherein establishing a public key for encrypting subsequent messages sent to the receiver including generating a pair of public and private keys at the receiver and posting the public key to a certificate server, and determining whether a receiver has a public key including first determining whether an unexpired receiver's certificate is available locally, and if not, accessing the certificate server to retrieve a receiver's certificate.

14. The system of claim 11, wherein the delivery method that does not require the receiver to have a pair of public and private keys prior to sending the message including using an identity-based encryption method.

15. The system of claim 11, wherein the delivery method that does not require the receiver to have a pair of public and private keys prior to sending the message including a web-based delivery method.

16. The system of claim 11, wherein the delivery method that does not require the receiver to have a pair of public and private keys prior to sending the message comprising:
    encrypting the message using a secret key;
    making the secret key accessible to a key server;

sending the encrypted message to the receiver;
sending the secret key from the key server to the receiver after the receiver is authenticated;
using the secret key to decrypt the message at the receiver.

17. The system of claim 11, wherein the delivery method that does not require the receiver to generate a pair of public and private keys prior to sending the message comprising:
encrypting the message using a secret key;
encrypting the secret key using a receiver specific key;
storing the receiver specific key associated with the receiver at the key server;
sending the encrypted secret key and the encrypted message to the receiver;
sending the receiver specific key from the key server to the receiver after the receiver is authenticated;
using the receiver specific key to decrypt the secret key;
using the secret key to decrypt the message;
storing the receiver specific key into an encrypted key file at the receiver.

18. The system of claim 11, wherein the receiver is authenticated to access the message using authentication information that can only be used to access the message for the first time.

19. The system of claim 18, wherein the authentication information includes a password sent to the receiver's email address and the password can only be used to access the message for the first time.

20. The system of claim 11, wherein the receiver is authenticated to access the message using evidence that the receiver can receive email messages sent from at least two different sources to the receiver's email address.

* * * * *